Patented May 12, 1931

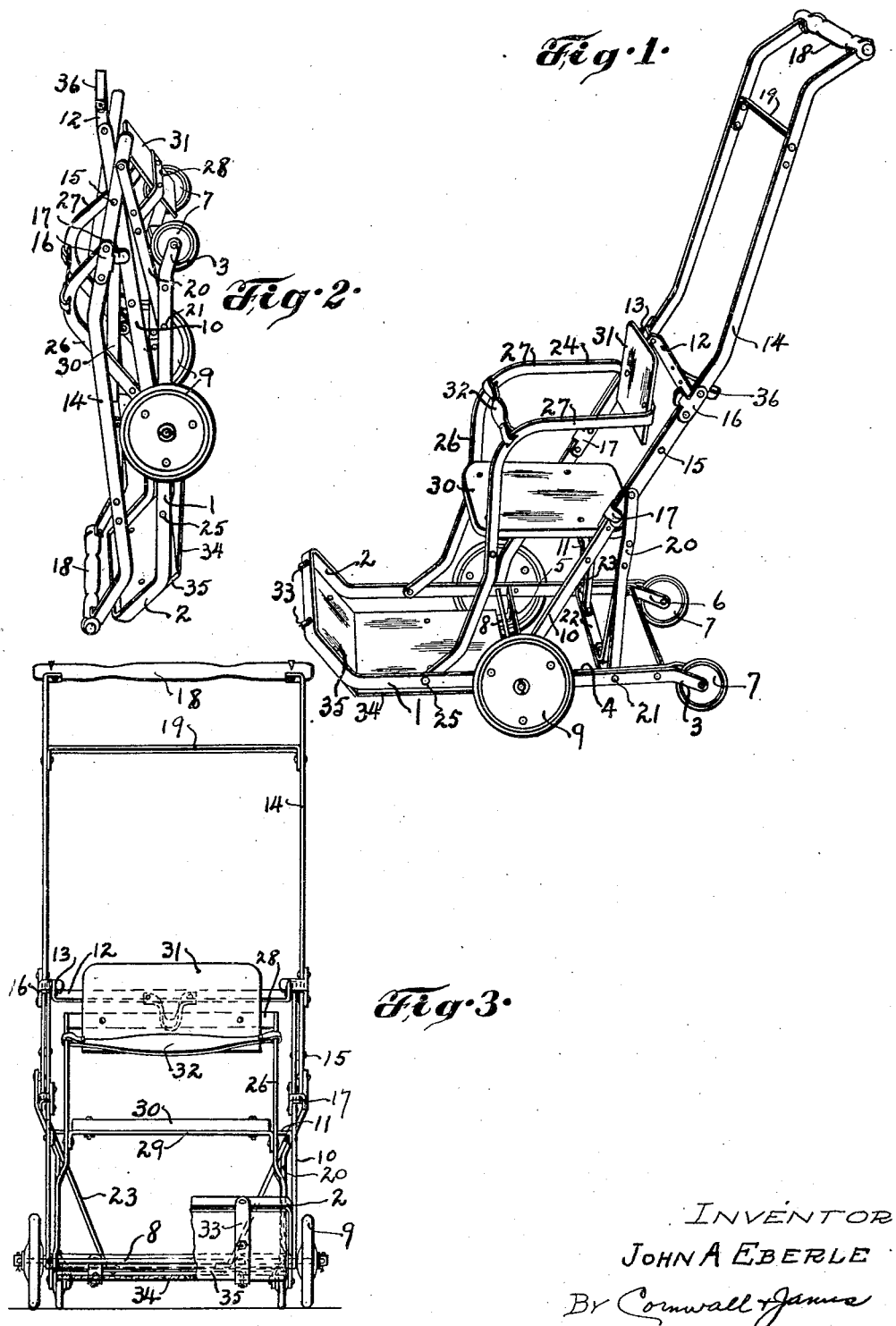

1,805,136

UNITED STATES PATENT OFFICE

JOHN A. EBERLE, OF ST. LOUIS, MISSOURI, ASSIGNOR TO THE PERFECTION MANUFACTURING COMPANY, OF ST. LOUIS, MISSOURI, A CORPORATION OF MISSOURI

CHILD'S VEHICLE

Application filed August 22, 1928. Serial No. 301,357.

My invention relates to a new and useful improvement in children's vehicles, and more particularly to a vehicle of the go-cart or stroller type which is swung close to the ground and has a low center of gravity.

In the ordinary vehicle of the stroller type the main axle is located to the rear of the center of gravity with the body carried above. The practice is to set the front axle under the foot rest, and, to make the seat in proper proportion, the center of gravity is customarily located a substantial distance from the ground. This also brings about a condition whereby a child may possibly tip the stroller over the front axle by standing on the foot rest.

With these features in mind, my principal object is to provide a stroller having a low center of gravity.

Another object is to provide a stroller that can not be tipped by a child in getting in or out.

A further object is to provide a stroller that will fold into a compact package.

With the foregoing and other objects in view, my invention consists in certain novel features of construction and arrangement of parts hereinafter more fully described and claimed, and illustrated in the accompanying drawings, in which—

Figure 1 is a perspective view of the go-cart in extended position.

Figure 2 is a perspective view of the vehicle folded.

Figure 3 is a front elevation of the vehicle in extended position, partially broken away.

The numeral 1 in the drawings indicates the base frame which is formed of a U-shaped piece of strip metal upturned at 2, its forward end to accommodate a toe board. The rearward ends 3 of base 1 are bent downwardly. 4 is a second U-shaped piece lying within the base frame 1 and riveted thereto. The closed end 5 of piece 4 serves as a cross brace for the frame while at the rear and open end the extremities 6 are bent downwardly and inwardly to coincide with ends 3 of the base frame 1. Wheels 7 are mounted between each of the ends 3 and 6 which extend substantially to the rear of the vehicle.

Adjacent the cross piece 5 of strip 4 an axle 8 is fixed in base frame 1 and has on each end thereof, exteriorly of the frame, freely mounted wheels 9. This axle serves also as a transverse brace for the frame. The parts 1, 4, and 5 which directly support the wheels 7 and 9 may be designated as the carriage frame.

A pair of strips 10 are mounted on axle 8 between the wheels and the frame and extend upwardly therefrom. These pieces 10 are joined together intermediate their ends by a seat supporting piece 11, the bent ends of which are loosely riveted. The upper ends of strips 10 are joined by a loosely riveted locking brace 12 through bent ends which terminate in hook portions 13. The side members 10 together with cross-members 11 and 12 constitute the chair supporting frame, since the chair is held in erect position by this frame together with the brace 20 as we shall presently show.

Handle pieces 14 are loosely riveted to pieces 10 at 15 to permit pivotal movement. The points of connection between these pieces are substantially below the upper ends of pieces 10 and above the lower ends of handle pieces 14. Above connections 15 the handle pieces 14 are provided with hook brackets 16 which are riveted in place and adapted to be engaged by the hook portions 13 of locking brace 12 when the vehicle is extended. Stop brackets 17 are riveted to the uprights 10 to limit the forward movement of the lower ends of the handle pieces.

A handle 18 joins the upper ends of the handle pieces 14 and may be formed of any suitable material. Intermediate the ends of handle pieces 14, a cross brace 19 is riveted to prevent excessive flexibility in these pieces. Handle pieces 14, 14, cross brace 19 and the handle 18 together, constitute a frame that may be termed the handle frame.

Near the lower ends of pieces 14 the open ends of a substantially U-shaped brace 20 are riveted. Brace 20 is also riveted at 21 to base frame 1 and its closed end 22 serves as a cross brace. Corner brackets 23 are provided on brace 20.

The forward body supports are formed of a single piece 24 having each end 25 connected to opposite sides of base frame 1. From these points of connection each portion 26 of the piece extends substantially upward and is then bent rearwardly in a horizontal plane forming arm portions 27. This same piece also comprises the back supporting piece 28. Intermediate the upright portions 26 of piece 24 a transverse strip 29 is pivotally connected through bent ends. The seat 30 of the vehicle is bolted in place to strip 29 and the supporting piece 11.

The back 31 is suitably fastened to the back supporting piece 28. A retaining strap 32 is provided to extend between the arm portions 27. The side pieces 26, cross pieces 28, 29, bottom 30 and back 31 together form the chair of the vehicle, hence these members collectively may be designated as the chair frame.

Longitudinally disposed floor and toe board supporting pieces 33 are fixed to the forward end of base frame 1 at the upturned portion 2. Pieces 33 are bent in conformity with the base frame and attached to the cross brace portion 5 of piece 4. The floor board 34 is suitably fastened to strips 33 as is the toe board 35.

A loop member 36 is fixed to the locking brace 12 and may be used to support a parasol or other top when the vehicle is extended and is suitable as a handle or means to hang the vehicle when it is folded.

To fold the vehicle, the locking brace 12 is turned to disengage hook portions 13. The handle is swung forwardly, which movement first slightly raises the seat through the pivotal connection 15 and then lowers the seat to a position adjacent the base frame 1. The raising of the seat occurs since the brace 20 is swung past a point of alignment with the handle pieces 14. This feature makes the device to an extent self-locking. The strips 10 and the brace 20 swing rearwardly while the handle is swung forwardly to also lie adjacent the base frame 1 and form a compact package.

To extend the vehicle, the handle is raised which action swings pieces 10 and brace 20 upwardly and forwardly. On the completion of the possible movement of the handle, the locking brace 12 is turned to engage the hook portions 13 and complete the locking which was initiated by brace 20 passing its point of alignment with handle pieces 14.

The floor board 34 is disposed below axle 8 and extends a substantial distance forwardly thereof. The floor board and frame are positioned approximately one inch above the supporting surface. In the event a child should step on the extreme forward portion of the vehicle in either entering or leaving, the tipping action is restricted to the distance of the floor board 34 from the ground. The vehicle as a whole cannot be tipped by the weight of a child which it is built to carry. The trailing wheels 7 extend a sufficient distance to the rear to avoid tipping over the rear wheels even should a child stand in the seat and lean against the handle pieces 14. Tipping to either side is practically impossible because of the low center of gravity and relatively wide tread of the wheels.

It is to be understood that minor changes in the size, form and construction may be made without departing from the spirit of my invention.

I claim:

1. In a child's vehicle, a carriage frame, wheels mounted thereon, a rigid chair frame pivotally connected thereto, a chair supporting frame pivotally connected to the carriage frame and supporting the chair frame, a brace serving as a prop between the carriage frame and chair supporting frame, and means for holding the brace in its propping position, said chair frame, chair supporting frame and brace being adapted to fold upon the carriage frame on releasing the holding means.

2. In a child's vehicle, a carriage frame, wheels mounted thereon, a rigid chair frame pivotally connected thereto, a chair supporting frame pivotally connected to the carriage frame and supporting the chair frame, a handle frame pivotally connected to and forming an extension of the chair supporting frame, a brace serving as a prop between the carriage frame and chair supporting frame, said brace having pivotal connection with both the carriage frame and handle frame, and means for holding the brace in its propping position, said chair frame, chair supporting frame and brace being adapted to fold upon the carriage frame on releasing the holding means.

3. In a child's vehicle, a carriage frame, wheels mounted thereon, a chair frame pivotally connected to said carriage frame, a chair supporting frame pivotally connected to the carriage frame and adapted to support the chair frame in upright position, a seat carried by the chair frame and supported by the chair supporting frame substantially in parallelism with the carriage frame, a brace for propping the chair supporting frame when the chair is in upright position, means for locking the chair supporting frame in propped position, said chair frame, chair supporting frame, and brace being collapsible onto the carriage frame when the locking means is released, and the chair seat maintaining its parallelism with the carriage frame to effect compactness.

In testimony whereof I hereunto affix my signature this 18th day of August, 1928.

JOHN A. EBERLE.